United States Patent [19]

Kikuchi et al.

[11] Patent Number: 4,851,861

[45] Date of Patent: Jul. 25, 1989

[54] THERMAL TRANSFER RECORDING DEVICE

[75] Inventors: Hiroshi Kikuchi; Jiro Tanuma; Kazuki Obara; Kazuyoshi Yoshida, all of Tokyo, Japan

[73] Assignee: Oki Electric Industry Co., Ltd., Tokyo, Japan

[21] Appl. No.: 147,555

[22] Filed: Jan. 19, 1988

[30] Foreign Application Priority Data

Jan. 16, 1987 [JP] Japan .................................. 62-6162

[51] Int. Cl.[4] .......................... G01D 15/10; B41J 3/02

[52] U.S. Cl. ................................ 346/76 PH; 400/120

[58] Field of Search ...................... 346/76 PH, 140 R; 400/120

[56] References Cited

U.S. PATENT DOCUMENTS 4,573,059 2/1986 Shinma et al. ................. 346/76 PH 4,586,834 5/1986 Hachisuga et al. ........ 346/76 PH X 4,661,703 4/1987 Ishikawa et al. .......... 346/76 PH X 4,737,860 4/1988 Ono et al. .................. 346/76 PH X

*Primary Examiner*—George H. Miller, Jr.

*Attorney, Agent, or Firm*—Spencer & Frank

[57] ABSTRACT

In a thermal transfer recording device which performs thermal transfer recording by using an ink ribbon which applies monochrome or polychrome transfer of ink to a base film and moves the ink ribbon and paper holding them between a thermal head and a platen, a first control section outputs a signal for the control of the heat quantity of the thermal head based on input binary data, a second control section outputs a signal for the control of the heat quantity of the thermal head based on input multi-value data, a setting unit outputs setting results based on the setting of the binary data print mode or the multi-value data print mode, and a selection unit selects the output signal of the first control section or the second control section based on the above mentioned setting results and supplies it to the above-mentioned thermal head.

9 Claims, 8 Drawing Sheets

THERMAL TRANSFER RECORDING DEVICE

BACKGROUND OF THE INVENTION

This invention relates to a heat transfer recording device which performs color and monochrome heat transfer recording, and more particularly to printing control based on binary and multi-valued data.

FIG. 1 is a perspective view showing an outline of the structure of an example of the conventional heat transfer color recording device. It illustrates a device known as plane sequential swing type. In the figure, the recording head (thermal head) 1 has a plurality of heating resistors (printing elements) lined up in the main scanning direction. It performs transfer recording. Paper 4 moves from paper roll 3 in the direction indicated by arrow A (secondary scanning direction) pressed by pressure roll 8. Ink ribbon 7 moves from supply roll 5 to take-up roll 6 in conjunction with the movement of a record carrier or paper 4, between recording head 1 and platen 2. This recording head 1 performs transfer recording while being pressed against platen 2 by spring 14 fixed to a protrusion of bracket 12 which supports recording head 1, with support point 13, which is attached to bracket 12, as its rotational center.

The width of ink ribbon 7 is almost the same as that of paper 4. It has tri-base-color (yellow, magenta, cyanogen) transfer printing inks applied in plane order to application areas 7*b* on base film 7*a*. Each application area 7*b* has a dimension L' just a bit larger than dimension L of the transport direction of recording area 9 established beforehand on paper 4. In other words, as shown in FIG. 1, transfer inks are applied to ink ribbon 7 in order to color for rectangular application areas 7*b* on base film 7*a*. Marks or indicia 10*a*, 10*b* and 10*c* corresponding to the print beginning positions of respective colors of the transfer ink are printed beforehand along an edge of application areas 7*b* of ink ribbon 7. It is then possible for these marks to be detected by ribbon sensor 11.

Head motor 15 rotates bracket 12 about support point 13 through cam 16 to move down so that recording head 1 is separated from platen 2 during recording (printing) standby and during movement to set ink ribbon 7 at the print beginning position of each color.

In a structure such as this the following operation is performed when it has been established beforehand to record (print) in the order yellow, magenta, cyanogen.

First, when turning on the power supply, after moving ink ribbon 7 until ribbon sensor 11 has detected mark 10*a* corresponding to the print beginning position of yellow and positioning it there, recording head 1 is pushed towards platen 2. By moving (transporting) paper 4 and ink ribbon 7 together in the secondary scanning direction yellow transfer is performed for recording area 9. Next, after paper 4 has been sent back, with recording head 1 separated from platen 2 by motor 15, to its original position, ink ribbon 7 is moved until sensor 11 detects magenta's mark 10*b* and as with yellow, magenta is transferred to recording area 9 to which yellow was transferred. Then, paper 4 is move back as was done with yellow and magenta, and after mark 10*c* is detected, cyanogen is transferred over recording area 9. In this way color recording is performed for a single frame (recording area 9).

The ink ribbon 7 used for this kind of thermal transfer recording device is divided into the following two types according to the composition of the ink applied. There is a fusion type ink ribbon which has wax as its main ingredient and is composed of pigments, additives, and softening agents, and a sublimation type ink ribbon which is composed of sublimating disperse dye, polyvinyl alcohol, synthetic resin, and a solution such as toluene, ketone etc.

FIG. 2 shows data concerning printing density of the ink transferred to paper 4 as measured with a Macbeth density meter, with respect to the energy applied to thermal head 1. When applied energy reaches a set value the printing density increases rapidly for the fusion type ink ribbon (shown with circles). If applied energy is increased beyond this it reaches a saturated state in which printing density does not increase. On the other hand printing density is almost proportional to applied energy for the sublimation type ink ribbon (shown with triangles).

The main uses of fusion type ink ribbons are hard copies from CRT's for computer terminals performing image expression with binary data. On the other hand, sublimation ink ribbons are used mainly for full color hard copies from television screens used in broadcasting which perform image expression with multi-value data. Because of difference in print control methods, both are used with their own specialized recording devices.

However, the thermal transfer recording device structure described above contains the problem described below.

Because of the progress of CRT terminal devices, it is possible for the image to express binary and multi-value data. However, because of the differences in the respective printer control methods it is necessary to provide separate binary and multi-valve hard copy devices to connect to them.

SUMMARY OF THE INVENTION

An object of this invention is to provide a single thermal transfer recording device which is able to print binary and multi-value data.

In order to solve the problem described above, this invention provides a thermal transfer recording device which uses an ink ribbon which applies monochrome or polychrome transfer ink to a base film, performs thermal transfer recording by holding and moving said ink ribbon and paper between a thermal head and platen, and is equipped with a first control section which outputs a signal for the control of the heat quantity of the above mentioned thermal head based on input binary data, a second control section which outputs a signal for the control of the heat quantity of the above mentioned thermal head based on input multi-value data, setting means which outputs setting results based on the setting of either the binary data print mode or the multi-value data print mode, and selection means which selects and supplies to the above mentioned thermal head the output signal of either the first control section or the second control section based upon the results of the above-mentioned setting.

The thermal transfer recording device according to this invention operates as follows. The first control section works to output a signal to control the heat quantity of the thermal head based on input binary data and the second control section works to output a signal to control the heat quantity of the thermal head based on input multi-value data. Also, the setting means (for example, a switch) works to output the mode setting results and the selection means works to select the output signal of either the first control section or the second control section based on the setting results. For example, should the binary data print mode be set by the setting means, the thermal head would be controlled by the output signal of the first control section through the selection means and the printing of binary data would be performed. On the other hand, should the multi-value print mode be set by the setting means, the thermal head would be controlled by the output signal of the second control section through the selection means and the printing of multi-value data would be performed. The thermal transfer recording device according to the invention is therefore able to solve the problems described above.

DETAILED DESCRIPTION OF THE PREFERRED EMBODIMENT

Figure 1:
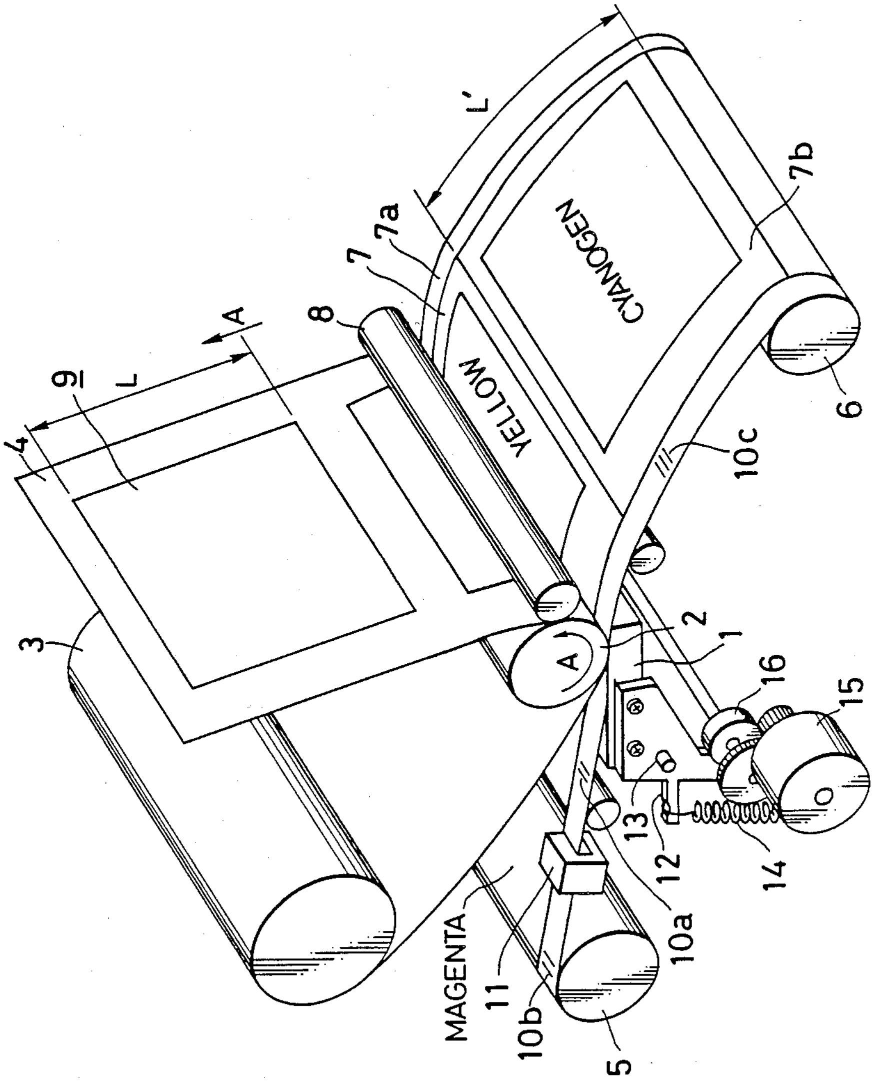
FIG. 1 PRIOR ART
FIG. 1 is a perspective view of a conventional thermal transfer color recording device.
Figure 2:
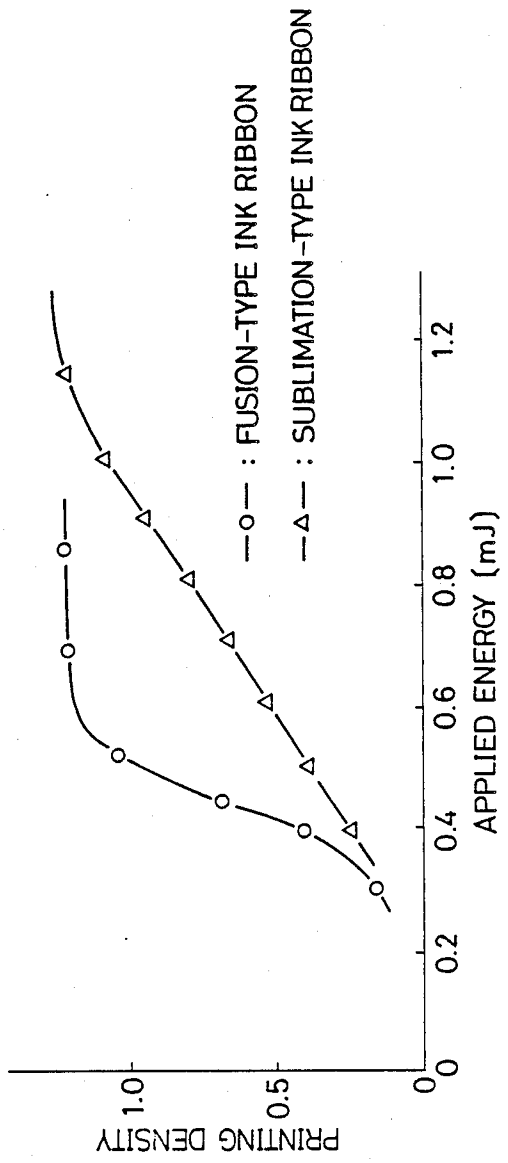
FIG.2 PRIOR ART
FIG. 2 is a graph showing the transfer characteristics of ink ribbons.
Figure 3:
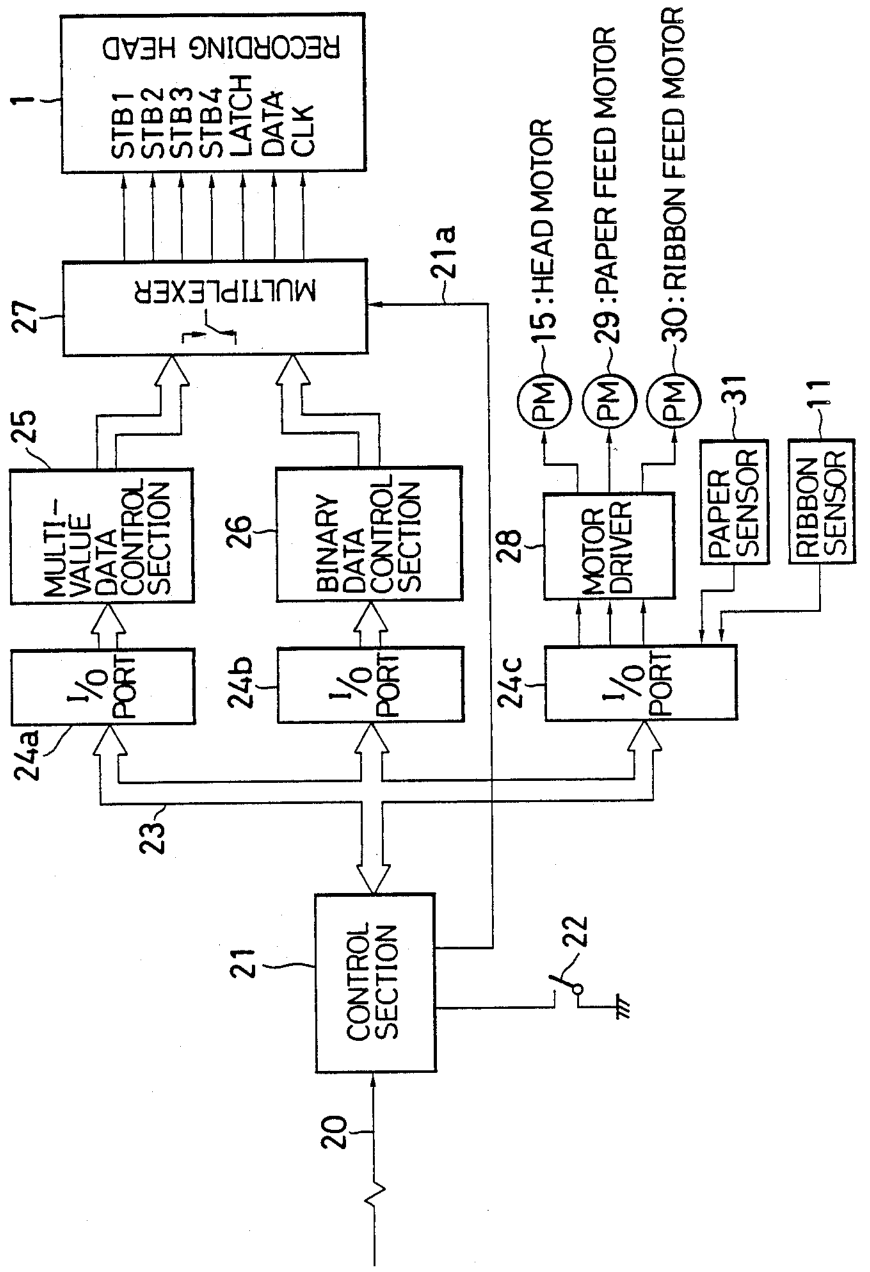
FIG. 3 is a block diagram showing a thermal transfer recording device of a first embodiment of the invention.

FIG. 3 is a block diagram showing a control system of the thermal transfer color recording device of a first embodiment of this invention. In the figure, reference symbols identical to those in FIG. 1 show structural elements of an identical nature. 20 is an interface for inputting the binary data or multi-value data which is to be printed. 21 is a control section composed of a microprocessor, ROM, RAM, timer. I/O port, etc. The ROM contains program and parameter data. The RAM is used as a buffer memory to contain data received. 22 is a mode switch on the operation panel etc. It is used to change (set) between the binary printing mode and the multi-value printing mode. The change-over signal is output to signal line 21*a* through control section 21. 23 is a common bus. 24*a* to 24*c* are I/O ports. 25 is a multi/-value data control section which outputs a signal for the control of the heat quantity of each print element (heating resistor) of recording head (line thermal head) 1 in response to multi-value data input from control section 21 through common bus 23 and I/O port 24*a*. 26 is a binary control section which outputs a signal for the control of the heat quantity of each print element of recording head 1 in reponse to binary data input from control section 21 through common bus 23 I/O port 24*b*. 27 is a multiplexer which supplies recording head 1 with the output signal of either the multi-value control section 25 or the binary control section 26 based on the change-over signal from signal line 21*a*. 28 is a motor driver. 29 is a paper feed motor to feed paper 4. 30 is a ribbon feed motor to feed ink ribbon 7. 31 is a paper sensor to detect the presence or absence of paper 4.

Based on the data from interface line 20, the position of the mode switch 22 (whether on or off), and data obtained from paper sensor 31 and ribbon sensor 11 through I/O port 24*c* and common bus 23, control section 21 not only performs the control of recording head 1 through I/O port 24*a* and multi-value data control section 25 during the multi-value data print mode and the control of recording head 1 through I/O port 24*b* and binary data control section 26 during the binary print mode, it also controls head motor 15, paper feed motor 29, and ribbon feed motor 30 through I/O port 24*c*.

Figure 4:
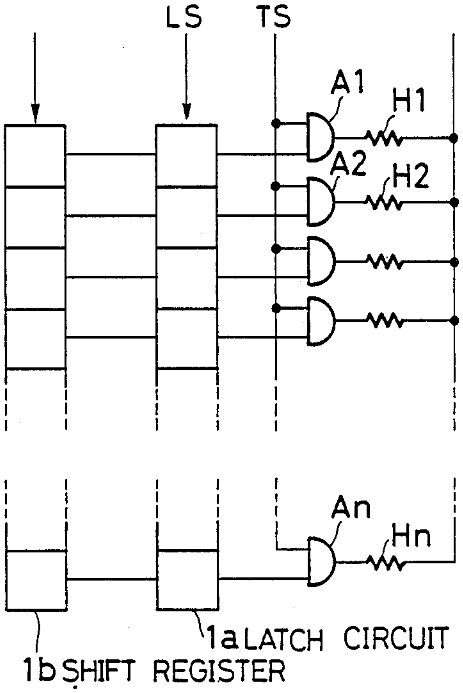
FIG. 4 is a diagram showing an example of a recording head.

FIG. 4 shows an example of recording head 1. As illustrated, it comprises a plurality of, e.g., n, heating resistors (print elements) H1 to Hn arranged in a line, AND gates A1 to An respectively associated with heating resistors H1 to Hn, a latch circuit 1*a* having n stages respectively associated with n heating resistors H1 to Hn, and a shift register 1*b* having n stages respectively associated with the n stage of latch circuit 1*a* and hence with heating resistors H1 to Hn.

Print data from multi-value data control section 26 or binary data control section 25 are serially input into shift register 1*b* and shifted through it. When the n stages of shift register 1*b* are filled with print data for all the heating resistors H1 to Hn, a latch signal LS is supplied to latch circuit 1*a*, upon which the print data in shift register 1*b* are latched in latch circuit 1*a*. Then a timing signal TS is supplied to all the AND gates A1 to An to open them. Accordingly, heating resistors H1 to Hn are selectively energized depending on data of the corresponding stages of latch circuit 1*a*: they are energized when the data of the corresponding stage is "1".

Figure 5:
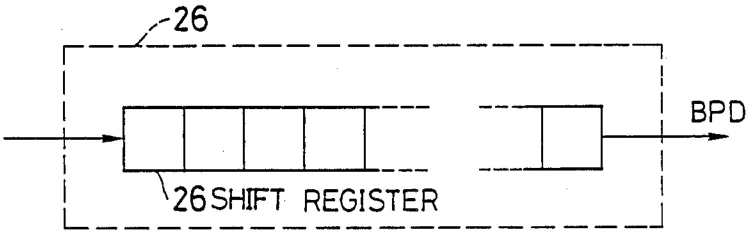
FIG. 5 is a block diagram showing an example of a binary data control section.

A example of binary data control section 25 is shown in FIG. 5. As illustrated, it comprises a shift register 26*a*. Binary data for one line of pixels are serially input into shift register 26*a*, shifted through it, and output from it, under control of various timing signals, not shown.

Figure 7:
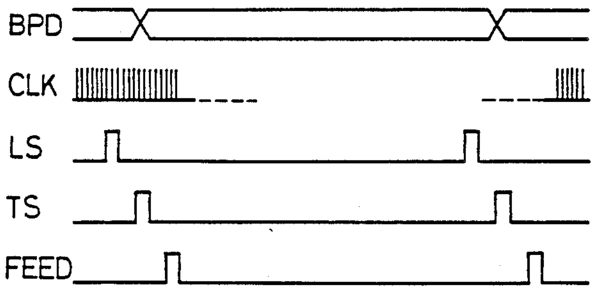
FIG. 7 and FIG. 8 are time charts showing operations of the recording head.

FIG. 7 shows operation of printing in the binary mode. When binary printing data BPD for one line of pixels are produced from binary data control section 25, they are fed into shift register 1*b* in time with clock signals CLK. When data of n bits for all the n heating resistors H1 to Hn have been input, a latch signal LS is produced, upon which the contents of shift register 1*b* are latched into latch circuit 1*a*. When a timing signal TS is next produced, heating resistors H1 to Hn are selectively energized depending on the contents of the respective stages of latch circuit 1*a*. The feed motor 29 is then driven to feed the paper into the position for printing the next line. Print data for the next line may be supplied when the latch circuit has latched the data for the preceding line.

Figure 6:
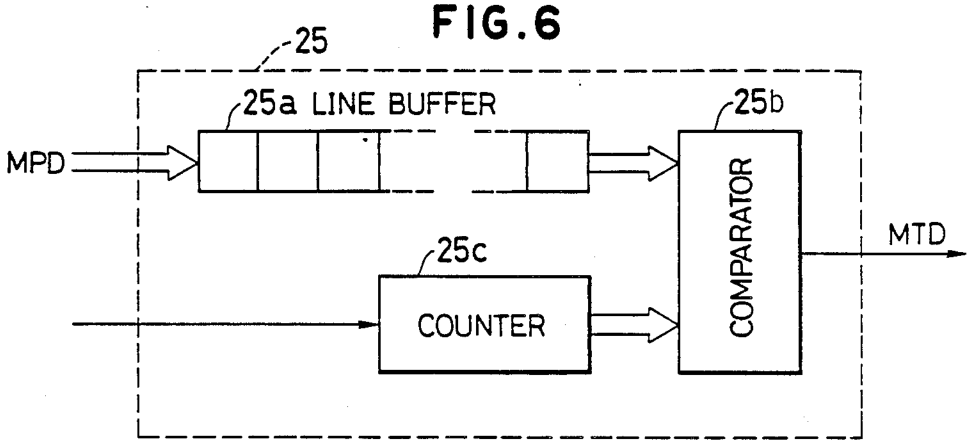
FIG. 6 is a block diagram showing an example of multi-value data control section.

An example of multi-value data control section 26 is shown in FIG. 6. As illustrated, it comprises a line buffer 25*a* having n stages, each stage storing multi-value data, e.g., 32-value data of 5 bits. The contents of line buffer 25*a* are circulated under control of timing signals not shown. The output of line buffer 25*a* is compared at a comparator 25*b* with an output of a counter 25*c* which is incremented by one each time the contents of line buffer 25*a* is circulated once. The output of comparator 25*b* is "1" when the output of line buffer 25*a* is greater than the output of counter 25*c*. Thus serial data consisting of n bits are produced once for each level or tone of the 32-value print data and heating resistors H1 to Hn are selectively energized depending on whether the value of data for each pixel is greater than the current value of counter 25*c*. The circulation of data through line buffer 25*a* and accompanying operations including serial output of data of n bits and selective energization of heating resistors H1 to Hn are repeated 31 times (which is one less than 32 because level or tone "0" does not require energization of heating resistors H1 to Hn).

Figure 8:
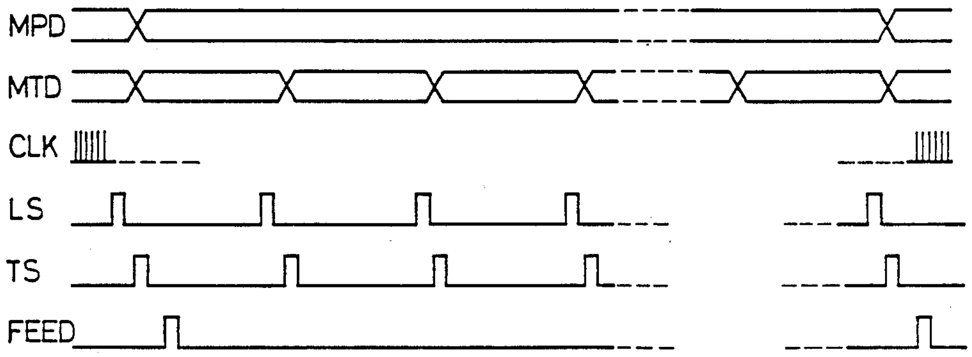

These operations are illustrated in FIG. 8. Data (multi-value tone data) MTD from multi-value data control section 25 for each level or tone are serially input into shift register 1*b*, latched by latch circuit 1*a* and used for selective energization of heating resistors H1 to Hn. These operations are repeated 31 times before the feed motor 29 is driven and the contents of line buffer 25*a* are replaced by data for the next line of pixels, and counter 25*c* is reset to "0".

In this way the total time of energization of each heating resistor during printing of a particular line of pixels is controlled to correspond to the desired printing density as represented by the multi-value print data.

In the above example, all the AND gates are simultaneously enabled. Alternatively, it may be so arranged that heating resistors H1 to Hn and AND gates A1 to An are divided into several, e.g., four groups, and AND gates of respective groups are given timing signals (strobe signals) in sequence so that heating resistors H1 to Hn of respective groups are energized in sequence. Such an arrangement is advantageous in reducing the required capacity of the power supply and restraining temperature increases.

Figure 9:
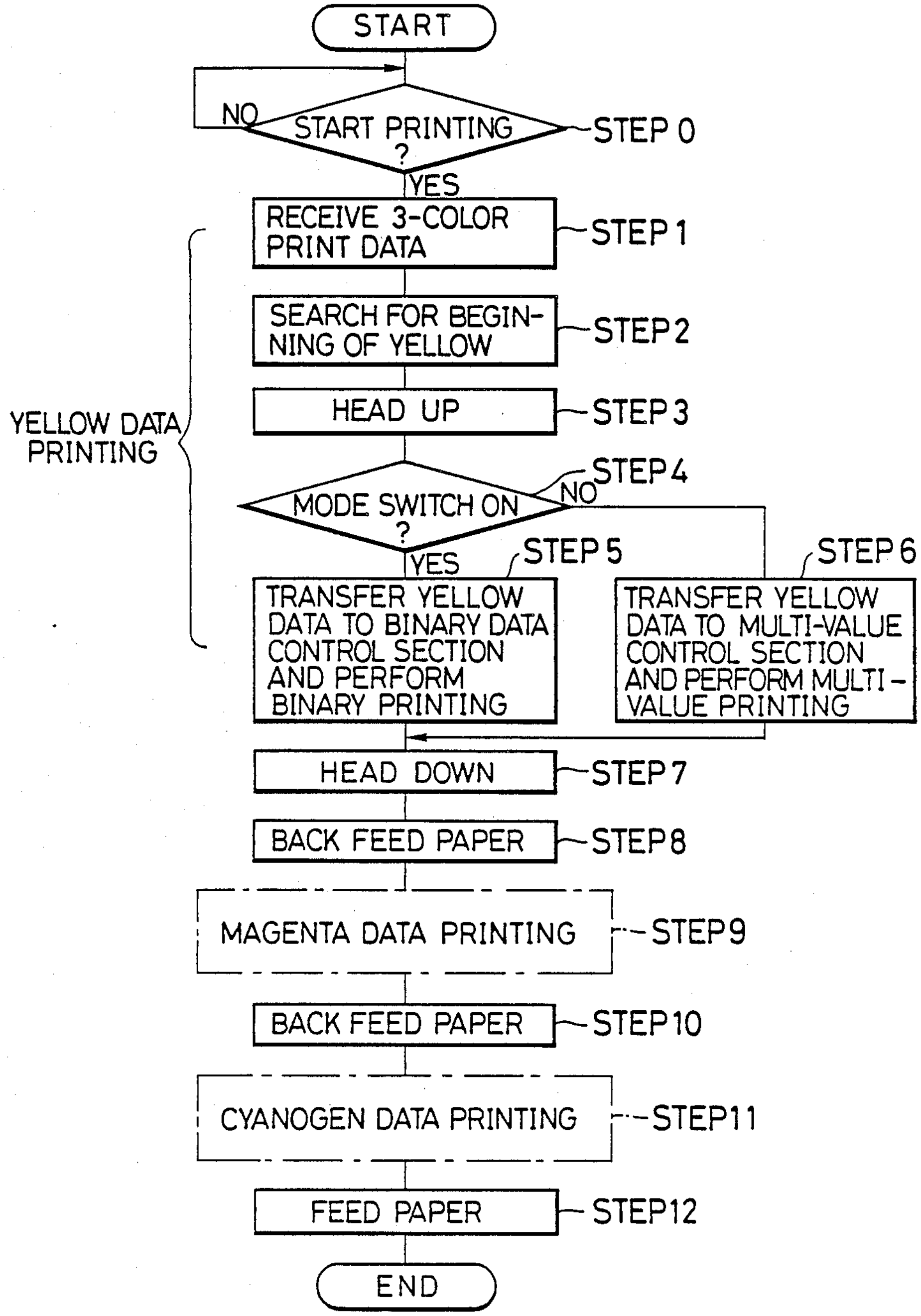
FIG. 9 is a flow chart showing the operation of the device of the first embodiment.

The operation of the overall system is now described with reference to FIG. 9.

First, printing start up is sent to control section 21 from an outside control device, etc., through interface line 20 (Step 0), and control section 21 receives tri-base-color printing data from the outside control device, etc., through the interface line and stores it in the buffer memory (RAM) (Step 2). Next, control section 21 controls ribbon feed motor 30, winding ink ribbon 7 up until yellow mark 10*a* is detected (Step 2). After the beginning of the yellow application area has been found in this way control section 21 controls head motor 15 pressing recording head 1 onto platen 2 with paper 4 and ink ribbon 7 between them (Step 3). Next, control section 21 discovers whether mode switch 22 is on or off and judges whether it is in the binary data print mode or the multi-value data print mode (Step 4).

If mode switch 22 is on for the binary data printing mode, control section 21 not only transmits the yellow data (binary data) from the buffer memory to binary data control section 26 through I/O port 24*b*, it also controls multiplexer 27 with a charge-over signal (along signal line 21*a*) so that it chooses the output signal from binary data control section 26 and performs binary printing by control from binary control section 26 (Step 5). In other words, signals to control the heat quantity of each print element (for example, data, clock signal, latch signal, strobe signal, as described above) are created in binary control section 26 to respond to binary data and supplied to recording head 1 through multiplexer 27. This results in each print element of recording head 1 being driven by a pulse of a specified pulse width corresponding to input data.

If, on the other hand, it is judged in Step 4 that the mode switch is off and this is the multi-value data print mode, control section 21 not only transmits the yellow data (multi-value data) from the buffer memory to multi-value data control section 25 through I/O port 24*a*, it also controls multiplexer 27 with a change-over signal (along signal line 21*a*) so that it chooses the output signal from multi-value data control section 25 and performs multi-value printing by control from multi-value control section 25 as follows (Step 6). In other words, signals to control the heat quantity of each print element (such signals includings, for example, data, clock signal, latch signal, and strobe signal, as described above) of recording head 1 are created in multi-value control section 25 to respond to multi-value data are supplied to recording head 1 through multiplexer 27. This results in each print element of recording head 1 being driven by a pulse of pulse width corresponding to input data.

When, in Step 5 or Step 6, the printing of one line is finished, paper feed motor 29 step feeds ribbon feed motor 30 and the next line is printed. By repeating this, one frame (recording area 9) of yellow data is printed.

When the printing of one frame of yellow data is finished, control section 21 controls head motor 15 separating recording head 1, which had been pressed toward platen 2, from platen 2 (Step 7). The control section 21 also controls paper feed motor 29, rotating it in the opposite direction from the printing direction (direction A) and back feeding paper 4 to return it to the first yellow printing position. This ends the yellow printing operation (Step 8).

Next the printing of magenta data is performed in the same way that the printing of yellow data was (Step 2–Step 7), using magenta data and the magenta application area of ink ribbon 7 (Step 9). When the magenta printing is finished, and paper 4 has been back fed as in Step 8 (Step 10), cyanogen data printing is performed in the same way the yellow data printing and magenta data printing were (Step 11). Once this has been completed, paper 4 is fed and the printing operation (color recording) for one frame is finished.

Figure 10A:
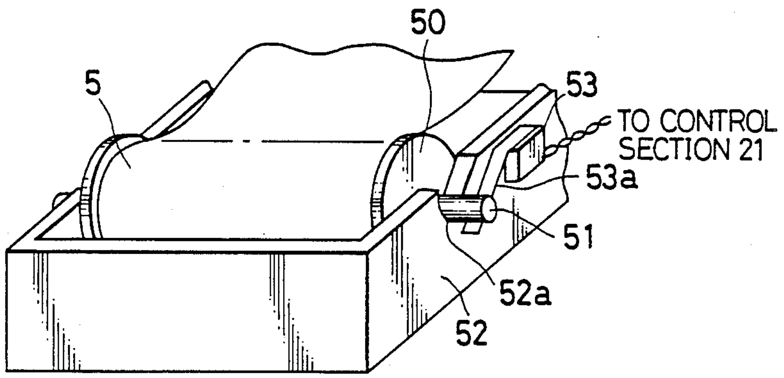
FIGS. 10A, 10B and 10C are perspective views showing the mode setting system for a second embodiment of this invention.
Figure 10B:
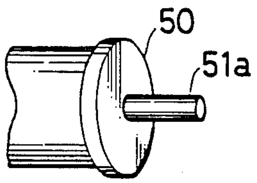
Figure 10C:
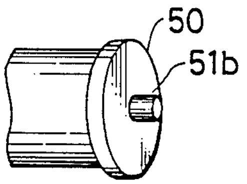

FIGS. 10A to 10C are perspective views showing the mode setting system as it occurs in a second embodiment of this invention. In the first embodiment (FIG. 3) setting of the binary data printing mode or the multi-value data printing mode is performed using mode switch 21 which is found on the operation panel. In contrast to this, in the second embodiment, setting is made by detecting (identifying) the shape of ribbon reel on which the ink ribbon 7 is disposed which differs depending on the mode selected, as described below.

In FIGS. 10A, 10B and 10C, 50 is an accessory or ribbon reel upon which ink ribbon 7 is wound to make it into supply roll 5. 51 is a rod-shaped supporting body which supports ribbon reel 50 in such a way that it is possible for it to rotate in concave section 52*a* of ribbon holder 52. Detector 53 detects the presence or absence of supporting body 52 and outputs a change-over signal to signal line 21*a* through control section 21 as did mode switch 22.

FIGS. 10B and 10C show that the length of supporting body 51 is different depending upon the type of ink ribbon 7 wound upon ribbon reel 50. When binary data printing is being performed, a fusion type ink ribbon 7 is wound onto ribbon reel 50 which has a long supporting body 51*a*, as shown in FIG. 10B, and by setting the supporting body 51*a* in ribbon holder 52, which supports the body 51*a* pushes arm 53*a* of microswitch 53 down and microswitch 53 is thereby turned on. When multi-value data printing is performed, a sublimation type ink ribbon 7 is wound onto ribbon reel 50 which has a short supporting body 51*b* as shown in FIG. 10C, and by setting the short supporting body in ribbon holder 52 microswitch 53 stays off as supporting body 51*b* is short and does not touch arm 53*a* of microswitch 53. As described above, according to the on/off state of microswitch 31, the change-over between binary data printing and multi-value data printing can be performed using the form of ribbon reel 50 (or, supporting body 51). A string of printing operations is performed as in the first embodiment. The above effect can also be easily realized for cartridge type ink ribbons by modifying the form of the cartridge form or accessory in which the ink ribbon is received.

Figure 11A:
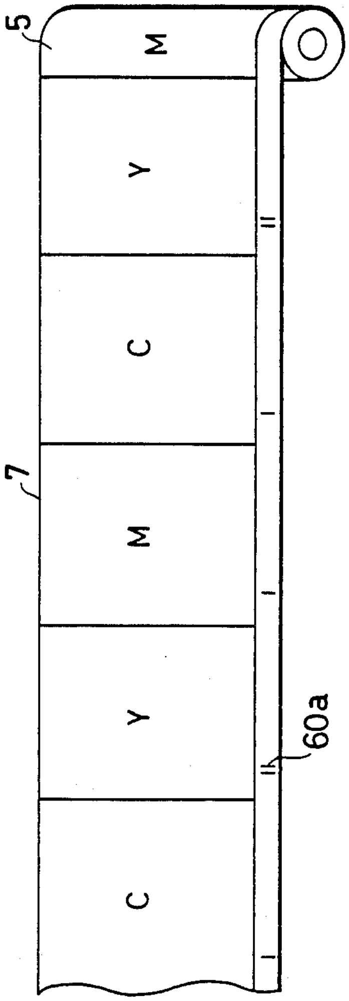
FIGS. 11A and 11B are perspective views showing the mode setting system for a third embodiment of the invention.
Figure 11B:
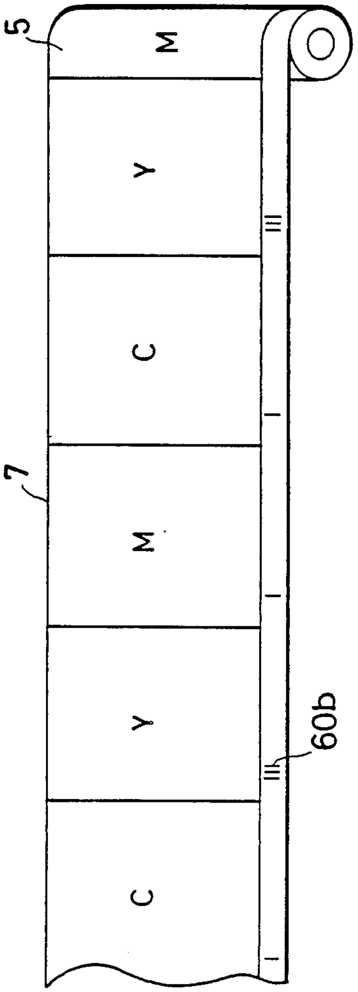

FIGS. 11A and 11B are perspective drawings showing the essential parts of the mode setting system for a third embodiment of this invention. They show an example of an ink ribbon to indicate the change-over between binary data printing and multi-value data printing, identifying the different types of ink ribbon 7 by the form of color marks on the ink ribbon 7. In FIG. 11A, 60*a* is a mark which shows the color yellow (Y) (comparable to 10*a* in FIG. 1) with a two line bar code. In FIG. 11B, 60*b* was made into a similar type of mark to show the color yellow (Y), but with a 3 line bar code. Yellow is the very first step in printing. Thus, in the operation to search for the start of the yellow application area at the beginning of printing, control section 21 judges through a sensor whether binary data printing or multi-value data printing is to be performed by the number of lines in the yellow mark. A flag is then set for the judgement results in a working area of a memory portion of the 21 controls section. After that, by referring to this flag, the printing mode can be changed, and the recording device can perform binary data printing and multi-value data printing with the same kind of control as in the first embodiment.

Fusion type ribbons and sublimation type ribbons are used according to the difference in the marks on the ink ribbon 7.

The above has been a detailed description of a thermal transfer recording device to perform binary and multi-value printing for color recording. A similar description could be given for a device to perform monochrome thermal transfer recording using an ink ribbon which applies monochrome transfer ink. It is furthermore clear that the same effects could be obtained using heat sensitive paper.

The explanation was made for color recording using the three colors, yellow, magenta and cyanogen. It is also clear that the same effects would be obtained from printing with 4 colors (with black having been added) or printing operations which use even greater numbers of colors.

As explained in detail above, using this invention it is possible to select and easily perform one of the two modes, which include the printing of binary data, and the printing of multi-value data with a single device. Furthermore it is possible to make the device relatively less expensive than the prior art solutions.

What is claimed is:

1. A thermal transfer recording device which performs thermal transfer recording by transfer of ink from an ink ribbon to a record carrier and moves said ink ribbon and said record carrier between a thermal head and a platen, and which is operable in a selected one of a first mode, in which the ink ribbon is of a fusion type used for recording in accordance with input binary print data, and a second mode, in which the ink ribbon is of a sublimation type used for recording in accordance with input multi-value print data, comprising:

a first control section which outputs a first signal based on input binary print data;

a second control section which outputs a second signal based on input multi-value print data;

mode switch means having a setting to indicate whether the first mode or the second mode is selected;

selection means responsive to said setting of said mode switch means for selecting said first signal when said first mode is selected or said second signal when said second mode is selected and for supplying the selected one of said first signal and said second signal to said thermal head, wherein said thermal head delivers a quantity of heat to the ink ribbon corresponding to the selected one of said first mode and said second mode, the quantity of heat delivered corresponding to the selected one of said first signal and said second signal.

2. A thermal transfer recording device as set forth in claim 1, further comprising identification means on one of said ink ribbon and an accessory to said ink ribbon for indicating whether said ink ribbon is of the fusion type or of the sublimation type, and sensing means for sensing said identification means and for providing an output for setting said mode switch means to indicate selection of one of said first mode and said second mode corresponding to the indicated ink ribbon type.

3. A thermal transfer recording device as set forth in claim 2 in which said identification means comprises indicia disposed on said ink ribbon.

4. A thermal recording device as set forth in claim 2 in which said accessory to said ink ribbon comprises a reel onto which said ink ribbon is wound, and said identification means on said accessory to said ink ribbon comprises the shape of said reel.

5. A thermal recording device as set forth in claim 2 in which said accessory to said ink ribbon comprises a cartridge containing said ink ribbon, and at least one of said first identifying means and said second identifying means is provided on said accessory and comprises the shape of said cartridge.

6. A method of thermal transfer recording using a thermal transfer recording device which performs thermal transfer of ink from an ink ribbon to a record carrier and moves said ink ribbon and record carrier between a thermal head and a platen, said device being selectively operable in a first mode in which said ink ribbon is of a fusion type used for recording in accordance with input binary print data and in a second mode in which said ink ribbon is of a sublimation type used for recording in accordance with input multi-value print data, comprising the steps of:

providing a first control section which outputs a first signal based on input binary print data;

providing a second control section which outputs a second signal based on input multi-value print data;

providing a first identifying means on one of the fusion type ink ribbon and an accessory to the fusion type ink ribbon;

providing a second identifying means on one of the sublimation type ink ribbon and an accessory to the sublimation type ink ribbon;

detecting said first identifying means or said second identifying means corresponding to the type of ink ribbon being used with said thermal transfer recording device;

selecting said first signal or said second signal in accordance with the corresponding one of said first and second identification means detected;

supplying the selected one of said first signal and said second signal to said thermal head; and applying heat by use of said thermal head to said ink ribbon being used with the recording device, the quantity of heat delivered corresponding to the selected one of said first signal and said second signal.

7. A method set forth in claim 6 in which at least one of said first and second identifying means comprises indicia disposed on said ink ribbon.

8. A method as set forth in claim 6 in which an accessory corresponding to the ink ribbon being used comprises a reel onto which the corresponding said ink ribbon is wound, and at least one of said first identifying means and said second identifying means is provided on said accessory corresponding to said ink ribbon being used, and wherein said at least one of said first and second identifying means comprises the shape of the corresponding said reel onto which the corresponding said ink ribbon is wound.

9. A method as set forth in claim 6 in which said identification means is provided on materials accessory to said ink ribbon and comprises the shape of the cartridge containing the ink ribbon.

* * * * *